INVENTORS
CARL M. WENRICH and
BERNARD W. DOWNS
BY
William J. Ruano
their ATTORNEY

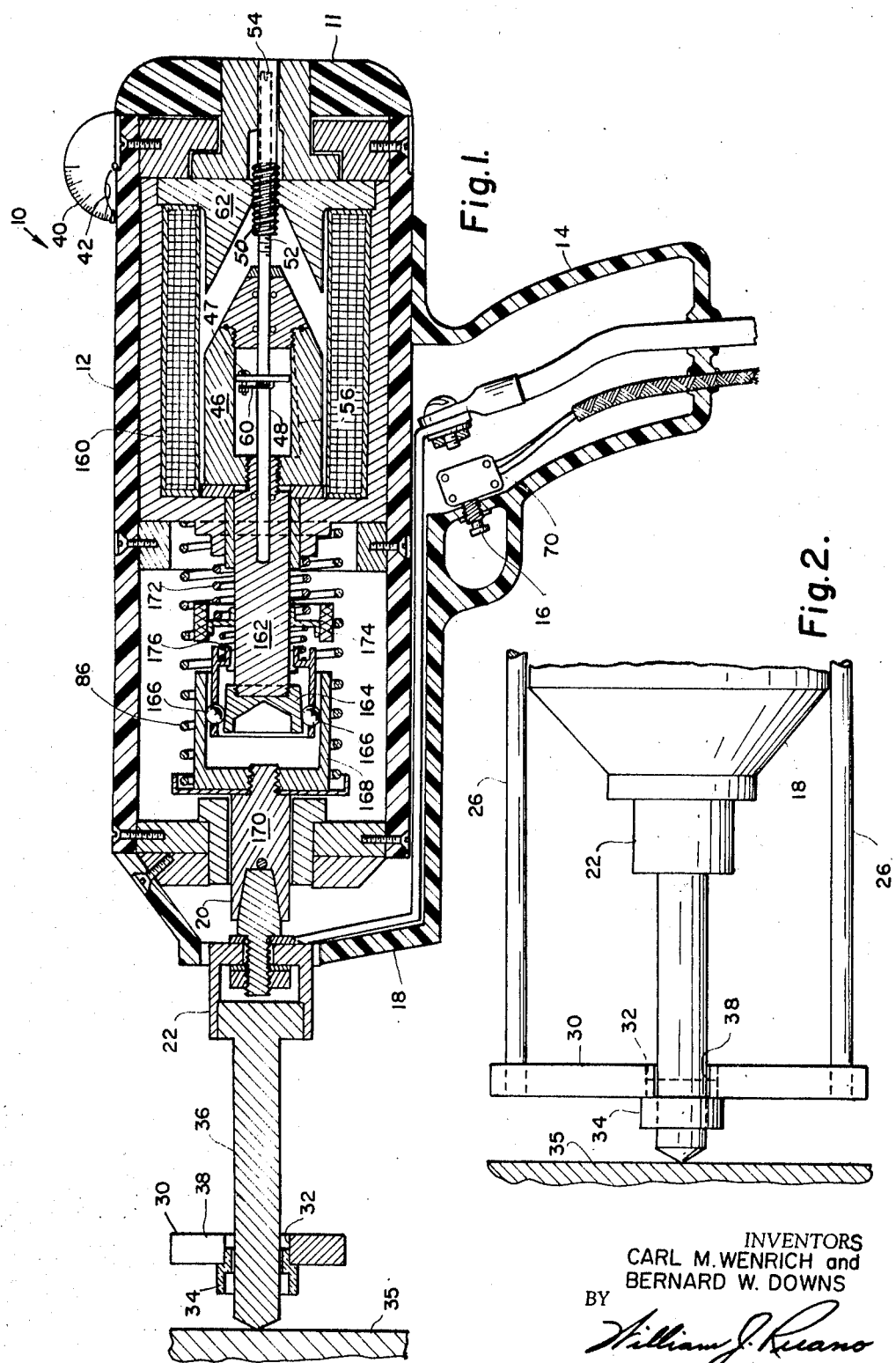

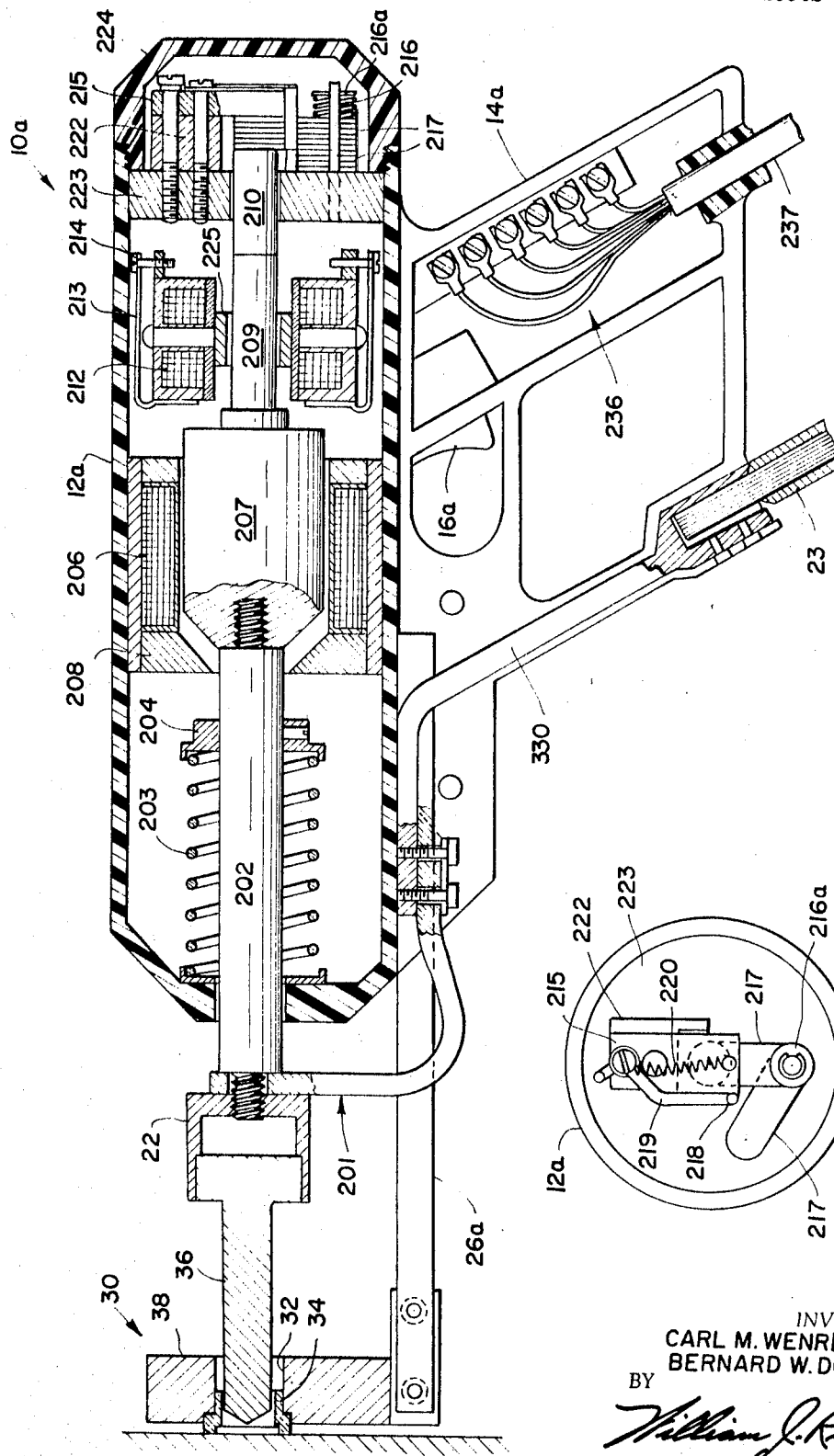

INVENTORS
CARL M. WENRICH and
BERNARD W. DOWNS
BY
*William J. Ruano*
Their ATTORNEY United States Patent Office 3,456,090
Patented July 15, 1969

3,456,090
STUD WELDING GUN HAVING COLD-SEATING CONTROL
Carl M. Wenrich, Reading, Pa., and Bernard W. Downs, Elverson, Pa. 19520
Filed Jan. 11, 1965, Ser. No. 424,743
Int. Cl. B23k 9/20
U.S. Cl. 219—98      12 Claims

ABSTRACT OF THE DISCLOSURE

A stud welding gun including a substantially cylindrical body portion enclosing electrical control means controlled by a trigger and switch on a handle portion for energizing a solenoid which forcibly pushes forwardly a shaft and supported stud extending axially so as to forcibly strike the work, while current is not flowing through the stud, sufficiently hard as to break through dirt and oxide. When the coil is de-energized, a spring will retract the stud from the work to draw an arc. Shim means are provided for providing incremental adjustments of the stop for limiting lifting movement of the stud.

---

This invention relates to a stud welding gun and control system therefor.

An outstanding disadvantage of stud welding guns of well known construction is that often times it is difficult or even impossible to strike an arc upon application of the gun to the work.

Another disadvantage is that such guns are relatively of large size, heavy, cumbersome and complicated in construction, as well as expensive to manufacture.

Still another disadvantage is that voltage variation and ambient temperature variations adversely affect the control of the weld-cycle time.

An object of our invention is to provide a novel stud welding gun and circuit that will obviate the abovementioned difficulties and that will always assure firing immediately upon application of weld current to the stud.

A more specific object of the present invention is to provide a highly improved stud welding gun which is of a size not much greater than that of an ordinary 45 caliber pistol.

Another object is to provide a constant voltage timing circuit which allows more precise control of the weld-cycle time so as to allow more reproducible results irrespective of wide variations in ambient temperature.

Other objects and advantages will become more apparent from a study of the following description taken with the accompanying drawings wherein:

FIG. 1 is a longitudinal, cross-sectional view of a stud welding gun embodying the principles of the present invention;

FIG. 2 is an enlarged, fragmentary, elevational view of the front portion of the gun shown in FIG. 1;

FIG. 5 is a longitudinal, cross-sectional view of a modification of the stud welding gun;

FIG. 6 is an end view as viewed from the right of FIG. 5 with the cover 224 removed;

Figure 3:
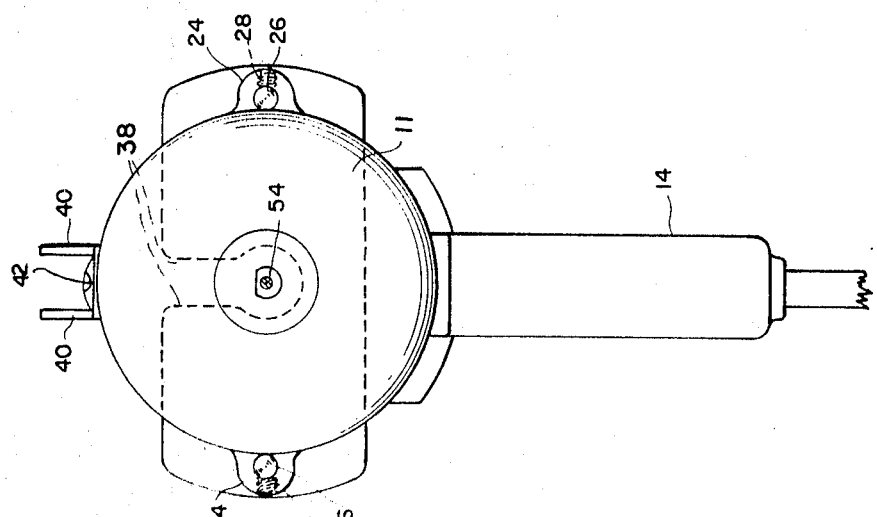
FIG. 3 is an end view as viewed from the right of FIG. 1.

Referring more particularly to FIGS. 1, 2 and 3 of the drawing, the gun, generally denoted by numeral 10, is a tool that will automatically electric arc weld a stud or bar of metal to another piece of metal, with reproducible accuracy with respect to time, weld energy and angular position.

The gun 10 is approximately cylindrical in shape, with a comfortable pistol grip handle 14. It has a trigger 16 and trigger guard, located and sized so that an operator's index finger can operate while wearing gloves. The body 12 and handle 14 of the gun are of an insulating material, so as to prevent electric shock hazard. The back end of the gun is a knob 11, which, by turning, adjusts the amount of stud lift. The front end 18 of the gun is conical in shape, to allow easier viewing of the stud 36 and work area 35 while setting up and welding.

There is a taper chuck 20 on the front end of the gun which will accept a variety of friction chucks 22. These friction chucks are so sized as to accept the various studs or bars to be welded.

There are sockets 24 located on the outside of the gun body, into which support rods 26 will fit. There are, recessed into the sides of these sockets, lock screws 28, which, when tightened, will prevent movement of the support rods.

At the front end of the support rods, there is a bridging device 30, made of an insulating material; which serves to securely fasten the support rods together, also, to form a socket 32 for a ceramic cup 34.

The ceramic cup 34 is a commercial item used to provide a bearing for the movement of the stud 36 and a mold which forms the molten metal into a uniform fillet around the stud as it is pushed into the pool.

The socket 32, which holds the ceramic cup 34, is so formed that when the stud is welded to the work, the gun may be removed from the stud 36 by moving the bridge to the side. A slot 38 is provided in the bridge 30, which is slightly larger than the diameter of the stud body.

The distance of the bridge from the front end of the gun is determined by the length of the stud or bar to be welded. The adjustment of this bridge is accomplished by sliding the support rods in the sockets of the gun body. When the proper adjustment has been determined, the rods are locked by means of the recessed lock screws.

There is mounted on the gun an adjustable bubble level sight 42 for aiming the gun toward the work at a preset angle, whereby any variation from that angle can be detected and displayed.

The gun has a mechanism for the purpose of producing an accurate, adjustable and reproducible lift of the stud from the work. The welding current is conducted to the stud by means of a contactor which is energized immediately after lifting occurs. The stud or bar is then quickly returned to the work, with a sharp impact, so as to break existing oxide or foreign matter from the surface of work, enabling the positive striking of the arc. The same mechanism again quickly lifts the stud to an accurate and reproducible level, simultaneously drawing an arc, the heat of which produces a pool of metal into which the stud is then returned in a controlled manner, so as not to splash the molten pool of metal produced by the arc, hereinafter known as "soft plunge."

The "soft plunge," i.e., rate of return is adjustable and accurately reproducible, as follows:

Plunger 46 is bored out to form a cylinder, in which a piston 47 is forced to travel, since piston rod 48 is fixed within stop 50 by threads 52 on the outside of rod 48 and inside stop 50. There is a screwdriver adjustment slot 54 on the end of the rod 48 so that the position of the piston within the cylinder can be adjusted from the back of the gun. There is a tapered slot 56 connecting the front of the piston to the back of the piston. In the piston 47, there is a one way poppet valve 60, which allows fluid to flow from the front of the piston to the back of the piston, but prevents flow in the opposite direction.

When the plunger moves toward the pole piece 62, piston 58 forces oil through the poppet valve 60, therefore, allows the plunger 46 to move back easily. When the plunger moves away from the pole piece, the valve 60 closes and the oil must then flow through the slot, or orifice 56.

The slot is tapered along its entire length, so the rate of flow of oil is determined by the position occupied by the piston 47. The position is adjustable by the screwdriver slot 54 in rod 48. Thus, a "soft plunge" is assured.

When the trigger switch 16 is depressed, current flows in the solenoid coil 160 producing a magnetic flux which then appears between plunger 46 and pole piece 62 tending to draw the plunger against the pole piece. The plunger moves toward the pole piece, drawing rod 162 with it. Rod 162 moves taper cone 164 forcing balls 166 against clutch cup 168 thereby locking the clutch cup 168 to the rod 162. The clutch cup is fastened to bar 170, an extension of the taper chuck 20, which accepts the friction chucks 22, sized to fit various studs or bar sizes.

When bar 170 moves, the stud 36 moves with it, drawing the stud away from the work. When the plunger 46 is drawn toward the pole piece, the train of parts just described compresses spring 86 and spring 172. Spring 86 tends to drive the stud back toward the work, when the solenoid 160 is de-energized, but the piston 47 and rod assembly, located inside the plunger 46, slows the return of plunger 46 to its original position. The space surrounding the piston is filled with a silicone oil, of a specific viscosity. There is a poppet valve 60 spring loaded so that when the solenoid is energized the valve is opened and allows free movement of the piston inside of plunger 46. However, when the plunger 46 is returning to its forward position, after current is removed from solenoid 160 the poppet valve 60 closes forcing the oil to pass through a small orifice 56. This retards the forward movement of the plunger, permitting the stud to enter the molten pool gently, as in a "soft plunge," while offering no resistance to its movement toward the rear of the gun. However, when solenoid 174 is energized, the clutch cup 168 and stud 36 are allowed to go forward rapidly under the pressure of spring 86 but the plunger 46, rod 162 and cone 164 still return to their original position slowly. Spring 172 forces the plunger and rod 162 to be always in the most forward position until the solenoid 160 is energized.

Spring 176 forces balls 166 into constant contact with clutch cup 168 and taper cone 164. When separate solenoid 174 is energized, it compresses spring 176 and allows clutch cup 168 to be free of the balls 166 and cone 164. When this happens, spring 86 will push the stud 36 toward the work with no restraint. This method provides a sharp impact, necessary to break through any existing oxide or other foreign matter on the work.

By depressing the trigger switch 16, the timing mechanism in the controller initiates the current flow to solenoid 174 at the proper time.

DESCRIPTION OF STUD WELDER CONTROLS

Figure 4:
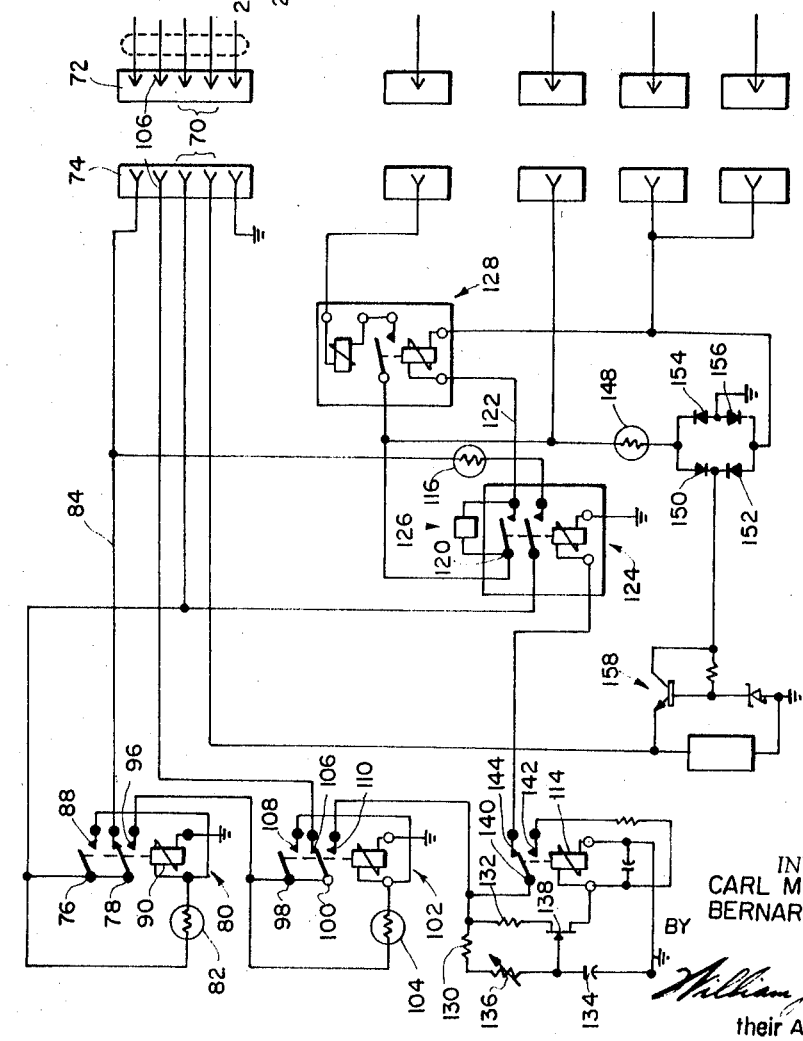
FIG. 4 is a schematic diagram of a control circuit for the gun shown in FIGS. 1, 2 and 3.

FIG. 4 shows a control system to control the welding time of a metal stud, of any given size, in such a manner as to produce a sound, dense weld, with ample fillet between the stud and the work, or parent metal.

The control box and system are designed for complete field and shop portability. That is, the control box and gun can be used at extended distances from the power source.

When the trigger switch 16 on the gun 10 is depressed, the conductors 70 in the gun cable connect the positive pole of the rechargable battery to arms 76 and 78 of relay 80, also connect the positive pole of the battery through thermistor 82 to the coil 90 of relay 80. Contact 78 of relay 80 then connects the battery to the stud lift solenoid through the gun cable 72. This causes the solenoid to lift the stud from the work, thereby compressing spring 86 in the gun. The current in thermistor 82 causes same to heat, thereby reducing its resistance until same is low enough to close the relay contacts which are normally open. When relay 80 closes, contact 88 connects the battery to the coil 90 locking the relay 80 in the energized position. Contact 96 connects the battery to arms 98 and 100 of relay 102 and to thermistor 104. Contact 106 of relay 102 connects the battery to the clutch release coil 106 through the gun cable 72. This causes the clutch to be released, allowing spring 86 in the gun to rapidly return the stud to the work in a tapping or striking manner, as in a center-punching action, breaking through any existing scale or oxide or other insulating surface contamination. This produces a positive contact between the stud 36 and the work, or parent metal.

At the same time, current through 104 lowers its resistance until relay 102 closes, when arms 98 and 100 are connected to 108 and 110 respectively, 108 locks the relay 102 in the energized position and 110 connects the battery to the coil of relay 114 through 106 of relay 100. Relay 114 then closes, connecting the battery through arm 100 and contact 110 and through thermistor 116 to the stud lift solenoid in the gun 10. Arm 120 and contact 100 connect the welding power source to the coil 124 of the contactor (126) relay 128 which conducts weld current to the gun through the weld current cable. When 116 builds up enough heat, the stud lift solenoid lifts the stud, thereby drawing an arc between the stud and the work, or parent metal.

When the contact 110 of relay 102 was made, the battery was connected to 132. 130 allowed current to flow into capacitor 134 slowly charging same, at a rate determined by rheostat 136. When 134 reaches the proper potential, transistor 138, conducts energizing relay 114, connecting arm 140 to contact 142, which locks the relay in the closed position.

As relay 114 closes, arm 140 disconnects the battery from contact 144 releasing relay 124 which releases the contactor relay 128, disconnecting the power source from the stud welding gun. At the same time, relay 124 releases the stud lift solenoid, which allows the stud to return to the work. The stud enters the puddle in a controlled manner due to the action of the piston 48 and cylinder in the plunger 46 as explained in the description of the stud welding gun. A sound fusion weld between the stud and the work, or parent metal is thus produced.

Ballast tube 148 is a device which offers a resistance proportional to the current flow through it, and this serves to regulate the voltage appearing across the bridge rectifier formed by 150, 152, 154 and 156, respectively. This rectifier serves as an automatic current reversing switch, so that the output of the bridge always has the same polarity, independent of the input polarity.

The junction of 150 and 152 is connected to voltage regulator 158 which serves to supply the correct charging voltage for the battery. This circuitry is necessary to assure accurate and reproducible timing in the electronic and relay circuits.

Figure 7:
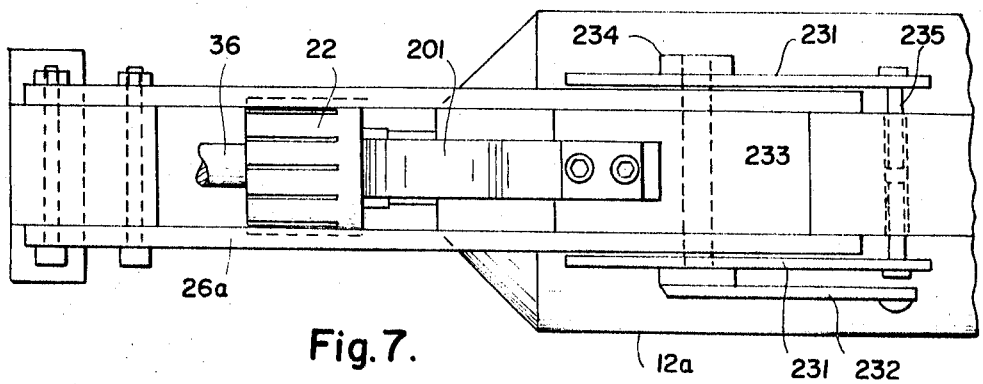
FIG. 7 is a fragmentary, bottom view of the forward portion of the gun shown in FIG. 5; and, FIG. 8 is a schematic diagram of the control circuit for the gun shown in FIGS. 5, 6 and 7.
Figure 8:
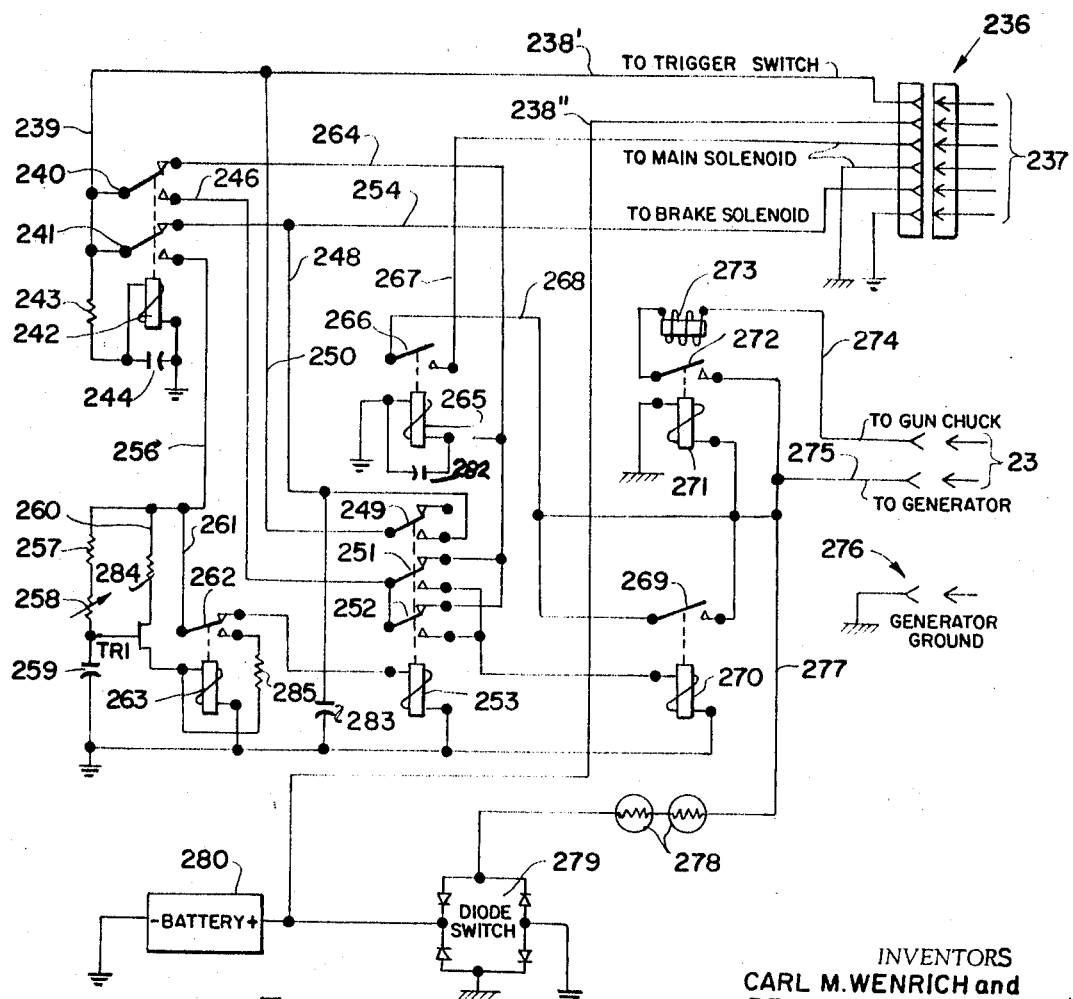

FIGS. 5, 6 and 7 show a modification of the gun, and FIG. 8 shows a modification of the control circuit therefor. The gun, generally denoted by numeral 10a, is equipped with a comfortable pistol grip handle 14a and is the approximate size of a 45 caliber automatic pistol, except that the body 12a of the gun is somewhat larger in size. It has a trigger 16a and trigger guard, located and sized so that an operator's index finger can operate while wearing gloves.

The body and handle of the gun are of a durable light material. The back end of the gun body contains an adjustment 224 which sets the lift of the stud from the work. The front end of the gun is roughly conical in shape to allow easier viewing of the stud and work area while setting up and welding. The main shaft 202 of the gun will accept a variety of friction chucks 22. These friction chucks are so sized as to accept the various bars or studs 36 to be welded. Guides 231, located in the gun body, accept the support rods 26a. These rods hold the foot 38 which positions the ferrule 34. The guides when tightened will prevent movement of the support rods 26a. The support rods 26a are so constructed, that by sliding in or out of the gun body, the proper plunge adjustment can be made, with relation to the length of the stud.

The ferrule 34 is a ceramic cup, a commercial item, used to provide a bearing for the movement of the stud and a mold which forms the molten metal into a uniform fillet around the stud 36, when it is plunged into the pool of metal.

The socket in the foot which holds the ceramic is so formed that when the stud is welded to the work, the gun may be removed from the stud by lifting the gun away from the work surface and moving the foot to the side, since a slot is provided in the foot which is slightly larger than the diameter of the stud body. The distance of the foot from the front end of the gun is determined by the length of the stud or bar to be welded. The adjustment of this foot is accomplished by sliding the support rods through the guides on the gun body. When the proper adjustment has been determined, the rods are locked by means of the clamping lever 232. The friction chuck 22 makes contact with a braided copper member 201, the other end of which attaches to a connecting block on the bottom of the gun body. The weld current cable 23 is bolted on to this block, or, attaches in such a manner so as to be securely fastened to said block. This feature allows the weld current to be conducted to the chuck 22 and thence to the stud 36, by the flexible copper member 201. This eliminates torque and friction on the main shaft of the gun, which would normally result from the weight of the cable, thereby eliminating variations in striking force and weld cycle timing. It also eliminates one source of wear on the gun parts.

The main shaft 202 of the gun has a friction chuck 22 on its front end, and a magnetic plunger 207 on the back end. The plunger operates inside of a solenoid 206. The plunger 207 and main shaft asesmbly are held to the rear of the gun body by a mainspring 203. The rearward motion of the plunger and main shaft assembly is limited by the stud lift adjustment. The forward motion of the plunger and main shaft assembly is limited by the end of the solenoid case. Therefore, only two adjustments are necessary.

The plunge adjustment is on the support rods 26a. The stud lift is adjusted by the stud lift adjustment at the rear end of the gun. The terminal connection 236 for the control cable 237 and trigger switch are in the pistol grid handle 14a. The rear extension 209 of the main shaft and plunger assembly contains friction surfaces on which friction pads or brake shoes 225 are allowed to bear. The friction pads are pressed against the friction surfaces by spring pressure from springs 213. The friction pads are supported by a magnetic shaft which forms a small magnetic plunger. This plunger rides inside of a small solenoid 212. When the solenoid is energized, the main shaft plunger is free to move without constraint. When the brake solenoid is de-energized, the main shaft and plunger have a pre-determined amount of constraint to their movement. This constraint is adjustable at the factory, by the proper choice of spring tension.

There is an adjustable bubble level sight mounted on the gun, for aiming the gun toward the work at a preset angle, whereby any variation from that angle can be detected and displayed. A stud is inserted in the chuck. The rear cap 224 of the gun is removed, and the proper number of shims 217 are placed into position. The number of shims is determined by the stud size. This adjusts the stud lift. The support rods are unclamped and the foot is so positioned that a straight edge across the bottom of the foot will touch the tip of the stud. The support rods 26a are then clamped by means of the clamping lever 232 and the gun is now adjusted for the selected stud.

With the stud 36 inserted in the chuck and a ferrule 34 inserted in the socket of the foot 38, the gun is positioned so as to place the stud directly at the point where it is to be welded. When the trigger 16a is actuated, the solenoid draws the plunger toward the work, causing the stud to strike the work sharply, so as to break any existing oxide or foreign matter from the surface of the work. The solenoid is then de-energized, and the weld current is applied to the stud. When the solenoid was de-energized, the main spring 203 pulled the stud from the work, drawing an arc. The stud lift adjustment stops the rearward travel of the stud at the proper lift distance. After the passage of a pre-set period of time, the weld current is removed from the stud, and simultaneously, the solenoid is energized, causing the stud to move into the pool of molten metal. The ferrule is so formed, as to produce an optimum bead, as in a fillet around the welded stud. If the stud were allowed to move into the pool freely, it would be possible to force molten metal beyond the ferrule, creating a condition known as spatter. To prevent this condition, the brake solenoid 212 is de-energized, when the main solenoid is energized during the plunge cycle. This allows the stud to enter the pool of molten metal smoothly. The molten metal solidifies almost instantaneously and the weld is now completed.

At this time, the gun is lifted away from the work, disengaging the stud from the chuck, and disengaging the foot 38 from the ferrule. The slot in the foot allows the gun to be removed from the welded stud and to be reloaded from the next weld.

This stud welding gun will also be used with a permanent ceramic foot. This ceramic foot is designed in two parts, mated, so as to provide a continuous mold around the stud and for a controlled fillet between the stud and parent metal as part of the weld. The ceramic foot also serves to constrain the spatter and minimize oxidation by reducing the exposure of the weld area to the surrounding atmosphere. The foot also concentrates the heat of the arc within the desired area and reduces the intensity of the arc so that the operator does not require a welding shield between his eyes and the part being welded.

The ceramic foot is in lieu of the commercial ferrule presently being used, as an expendable item with each weld. The two parts would be replaceable, as needed.

This foot eliminates the necessity for expending a ferrule for each weld. This foot eliminates the handling time involved with the placing of individual ferrules and saves the cost of same.

The stud welder controls have two functions. The primary function is to control the weld cycle time, which is that time that the weld current is supplied to the stud. The weld cycle time is a function of the size of the stud and the current delivered by the power source. It must, therefore, be adjustable and reproducible. It should also be calibrated into units of time with which the operator is familiar. The other function of the controls is a programming function. The sequence of events and the timing of all operations (except weld cycle time), is the same for all sizes and types of studs. Therefore, fixed timing circuits can be built into the controller when it is manufactured. This eliminates all adjustments except the weld cycle time.

The sequence of operations is as follows:

When the trigger switch 16a is actuated, the main solenoid relay 265 is closed by a time delay relay 242. The time delay relay automatically re-opens after a pre-set period of time. When the time delay relay opens, it releases the main solenoid relay, and energizes the contactor control relay 270. The solenoid control relay has a delayed opening to give the contactor time to close before the stud starts to lift. The main solenoid 206 is then de-energized, allowing the main spring 203 in the gun to lift the stud. When the time delay relay releases and the main solenoid was de-energized, the weld cycle timer was energized, starting the weld time cycle.

A precision potentiometer 258 in the weld cycle timer controls the duration of the timing cycle. At the end of the timing cycle, another relay is energized. This relay 263 is a sensitive relay, therefore is not required to handle much current. It is used only to control another relay. This other relay 253 has two functions. The first function is to de-energize the relay 270 which controls the main contactor 271. This disconnects the power source from the stud.

The second function is to re-energize the relay 265 which controls the main solenoid 206 and to de-energize the brake solenoid 212, thus causing the stud to be plunged into the molten pool of metal in a controlled manner. This completes the welding cycle. When the trigger is released, all elements of the circuit are returned to their original condition and the controller is ready to produce the next weld. The main solenoid and the main contactor receive their actuating current from the welding power source. The time delay relays and weld cycle timer, as well as the solenoid and contactor control relays, receive their power from an internal rechargeable storage battery 280. There is built into the controller, a regulated battery charging circuit, which also receives its power from the welding power source. This arrangement has two advantages—namely, (1) There is available a well regulated voltage for the timing circuit, which contributes to accurate timing and (2) No other power source is required other than the welding power source.

With the control connected to welding power source, current flows from the power source through current regulators 278 to the diode switch 279 which is the combination of diodes. The purpose of the diode switch is to present the proper polarity to the battery 280, no matter what connection is used at the power source. The current regulators have a resistance which is dependent upon the current into the battery, for a power source voltage variation from 25 to 100 volts. The battery charges up to 12 volts, approximately, and thereafter remains at that voltage. One end of the battery is connected to chassis ground. The other end goes to the trigger switch, which is a single throw, single pole spring loaded open switch.

When it is actuated, it closes a circuit and connects the battery to the arms of relay 242 and to one end of resistor 243. The arms of relay 242 connect to the normally closed contacts of relay 242, and from there to a coil on solenoid control relay 265, closing solenoid control relay, which energizes the main solenoid 206 in the gun. Also, the normally closed contact of relay 242 goes to the brake solenoid, releasing the friction brakes in order that the stud go forward rapidly, so as to effectively break through any existing oxide or contaminating surface on the parent metal to assure an efficient, positive contact. One end of resistor 243 connects to the coil of relay 242 and to capacitor 244. Capacitor 244 charges through resistor 243 until the voltage across capacitor 244 is sufficient to close relay 242. At this time, the arms of relay 242, transfer to the normally open contacts of relay 242.

This de-energizes the main solenoid. The main solenoid is, however, released after capacitor 282 discharges through the coil of relay 265. One normally open contact of relay 242 connects to the arm of relay 263 and, through the normally closed contact of relay 263, to the coil of relay 253 closing relay 253.

When relay 253 closes, relay 270 is energized, energizing the contactor 271 which connects the weld power source to the gun chuck. By this time, capacitor 282 has discharged sufficiently to release relay 265, which de-energizes the main solenoid and allows the main spring to lift the stud from the work, thereby drawing an arc. The normally open contact on relay 242, which connected to the arm of relay 263, also connects the circuit.

When relay 242 closed, the brake solenoid was released momentarily. But, when relay 253 closed, the brake solenoid was again re-energized. Capacitor 283 across the brake solenoid holds the brake off, during that transfer interval.

The timing circuit is composed of resistors 257 and 284, potentiometer 258, capacitor 259 and transistor TR–1. Transistor TR–1 is connected to the coil of relay 263. When current is applied through resistor 257 and potentiometer 258, capacitor 259 begins to charge. When the voltage across 259 reaches a certain precise value, transistor TR–1 turns on and closes relay 263. The arm then transfers from the normally closed contact to the normally open contact which is connected to the coil through resistor 285. Current through 285 is sufficient to hold relay 263 closed.

When the arm of relay 263 transferred from the normally closed contacts, relay 253 was de-energized, which also de-energized relay 270 and allowed the contactor 271 to open, thereby disconnecting the weld power source from the gun chuck. At the same time, relay 265 is energized and the brake solenoid is de-energized, allowing the springs to press the friction pads against the friction surfaces on the plunger with sufficient force to moderate the entrance of the stud into the pool of molten metal, when the main solenoid is energized, during the plunge cycle. When the trigger switch is released, current is removed from all parts of the circuit and the controls are ready to program the next weld.

ADVANTAGES OF STUD GUN AND CONTROLS

The following is a summary of the advantages of the stud gun: The ceramic ferrule built into the foot eliminates the necessity for expending one part with each weld. The shim lift adjustment requires no tools for setting up the stud lift. The shim lift adjustment allows accurate, reproducible adjustment for any and all stud sizes without the necessity for measurement or computation—also it has no loose parts to be misplaced.

With the hollow plunger, silicone oil plunge adjustment, the rate of plunge is easily adjusted for optimum operation. Variations of rate of plunge with temperature are minimized. The rate of plunge adjustment can be made by the operator if necessary. With the magnetic brake rate of plunge adjustment the constraint can be applied at the precise time required and can be adjusted to the precise value required.

Because the weld cycle starts with the stud in the retracted position, all ferrules can be used, even though with flux attached to them.

The gun allows more dependable welding because the weld cycle starts by first center punching to break thru any surface contamination, and then drawing an arc from the clean metal uncovered by the center punching operation.

Because there is no pre-loading of a spring required by the efforts of an operator, as is necessary with other guns, operator fatigue is reduced.

Because the gun has fewer parts, it is lighter, therefore, further reduces operator fatigue.

The gun has much fewer parts, will be easier and less costly to manufacture, and will require less maintenance.

Where pre-loading of a spring is required as in the case of other guns, it is more difficult to place the stud at the proper angle, since the gun tends to rotate aound the point of the stud. In the present gun, the stud is retracted, and the flat surface of the ferrule is all that contacts the work. It is, therefore, easier to accurately place the stud, both in position and angular alignment.

No tolls or fixtures or instruments are necessary to accurately adjust the gun for any stud, since the stud itself is the measuring stick to which the gun is adjusted, and the adjustments are made by a built-in lever and feeler gauge assembly.

The lift adjustment, which determines the length of the arc, is very important, as it, in concert with the value of the weld current and weld cycle time, determines the heat input to the weld, and thus determines to a large extent the quality of the weld. In present guns, this adjustment is made in a manner that precludes accurate reproduction of conditions even if the lift at this time is correct. In other words, you can set it accurately, but will have as much trouble resetting it as you had when you set it up in the first instance.

With the present gun, the lift adjustment is accomplished by the insertion or removal of hinged spacers, or shims. The adjustments are in precise increments and the increments relate directly to the incremental variations of the stud sizes. Therefore, no measurements or tables are required. All that need to be done is to count the shims. The shims are a part of the gun, can not be removed or misplaced. They are identical, so need not be marked.

The plunge adjustment is that adjustment which determines the distance that the stud is inserted into the molten pool of metal after the arc has been turned off. In this gun, the foot is so made that the amount of ferrule that will project from the bottom of the foot after the ferrule is seated in the foot will be equal to the plunge required. Then the bottom of the foot will be flush with the stud before the ferrule is inserted.

To adjust for plunge, insert the stud into the chuck, loosen the cam lever (232), place the stud against the work, lower the foot to the work, lock the cam lever. Now when the ferrule is inserted, the plunge adjustment is correct. No tools and no rulers are required.

The following is a summary of the stud gun controls:

The constant voltage timing circuit supply allows more precise control of the weld-cycle time so as to allow more reproducible results. The battery supply eliminates the requirement for A.C. power to the control circuits. The same control can be used in the shop and in the field. The all electronic timing circuits are lighter in weight, less subject to change in characteristics, and are easier to compensate for ambient condition variations. The diode switch allows proper connection of the generator without regard to polarity. The regulator allows wide variations in generator characteristics. The transistor timing circuits allow precise timing under widely different temperature extremes.

Thus it will be seen that we have provided a highly efficient stud welding gun and control circuit having the aforesaid enumerated advantages which constitute a very substantial improvement over known stud welding guns and circuits.

While we have illustrated and described several embodiments of our invention, it will be understood that these are by way of illustration only, and that various changes and modifications may be made within the contemplation of our invention and within the scope of the following claims.

We claim:

1. A stud welding gun comprising a stud actuating element, a study holding chuck on the forward end of said element, spring means for normally urging said element rearwardly, circuit means including electromagnetic means which, upon energization, urges said element forwardly against the action of said spring means without passing current through said stud to effect forcible currentless striking of the work by said stud so as to break through existing oxide or foreign matter on the surface of said work, said circuit means also including contactor means controlled by time delay means for initiating welding current flow through said stud only after a predetermined time period following said striking.

2. A stud welding gun as recited in claim 1, together with shim means at the rear of said element for providing an adjustable stop to limit, by definite increments, rearward movement of said element under the action of said spring means.

3. A stud welding gun as recited in claim 1 together with timing means energized by a separate battery to provide constant D.C. voltage for timing the duration of welding current flow.

4. A stud welding gun as recited in claim 1 together with electromagnetically controlled brake means for retarding movement of said element.

5. A stud welding gun as recited in claim 1 wherein said element is in the form of a longitudinally reciprocable shaft and wherein said spring means surrounds a portion of said shaft and wherein said electromagnetic means includes a magnetic core secured to said element.

6. A stud welding gun as recited in claim 4 wherein said brake means is applied by spring means and released by energization of said electromagnetic means.

7. A study welding gun as recited in claim 1 together with a foot provided with a bearing for receiving the forward end portion of the stud, and means for supporting said foot forwardly of said gun and for adjusting the position of the foot relative to the front end of said gun for accommodating different lengths of studs.

8. A stud welding gun as recited in claim 1 wherein said time delay means is energized by a battery providing a separate source of D.C. current.

9. A study welding gun as recited in claim 7 wherein said foot is of ceramic material.

10. A stud welding gun having the general shape of a pistol including a substantially cylindrical body portion enclosing electrical control means, and a pistol grip handle portion having a trigger for operating an electric switch to operate said control means, a shaft extending axially of said body portion and projecting forwardly of said body portion, a chuck secured to the forward end of said shaft for detachably supporting a welding stud, a spring surrounding said shaft and normally urging said shaft and chuck rearwardly, said shaft including a magnetic core portion, a coil surrounding said core and positioned so that when energized by closing of said switch said chuck and stud will be pushed forwardly sufficiently to forcibly strike the work so as to break through existing oxide or foreign matter on the surface thereof, and when the coil is de-energized, said spring retracting said stud from the work so as to draw an arc, and a main contactor controlled by time delay means for effecting flow of welding current through said chuck and stud only after a predetermined period of time following said striking so as to make said striking currentless.

11. A study welding gun as recited in claim 10 together with a welding cable terminal formed in said pistol grip handle to which the end of a welding cable is rigidly fastened, and a flexible cable connecting said terminal to said chuck, whereby the weight of the welding cable is borne by said handle.

12. A stud welding gun as recited in claim 10 together with a plurality of shims at the rear portion of said body for adjustably positioning a stop member for said main shaft by definite increments for adjusting the lift of the stud from the work.

References Cited

UNITED STATES PATENTS

| 2,217,964 | 10/1940 | Nelson | 219—98 |
| 2,640,133 | 5/1953 | Ainsworth et al. | 219—98 |
| 2,761,957 | 9/1956 | Sholle | 219—98 |
| 2,816,210 | 12/1957 | Mowry | 219—98 |
| 2,942,096 | 6/1960 | Jones | 219—98 |
| 3,052,793 | 9/1962 | Dash | 219—98 |

JOSEPH V. TRUHE, Primary Examiner

R. F. STAUBLY, Assistant Examiner

U.S. Cl. X.R.

219—93